United States Patent
Schlicht

(10) Patent No.: US 6,566,844 B1
(45) Date of Patent: May 20, 2003

(54) METHOD AND APPARATUS FOR EXTENDING THE FUNCTIONALITY OF A BATTERY

(75) Inventor: Michael Schlicht, San Jose, CA (US)

(73) Assignee: Battery Performance Technologies, Inc., Monte Sereno, CA (US)

( * ) Notice: Subject to any disclaimer, the term of this patent is extended or adjusted under 35 U.S.C. 154(b) by 0 days.

(21) Appl. No.: 09/680,835

(22) Filed: Oct. 6, 2000

Related U.S. Application Data

(60) Provisional application No. 60/157,997, filed on Oct. 6, 1999.

(51) Int. Cl.$^7$ ................................................. H02J 7/00
(52) U.S. Cl. ......................................................... 320/131
(58) Field of Search .................................. 320/131, 139, 320/140, 160; 429/49, 90

(56) References Cited

U.S. PATENT DOCUMENTS

| | | | |
|---|---|---|---|
| 3,808,487 A | 4/1974 | Feuillade | 320/139 |
| 4,385,269 A | 5/1983 | Aspinwall et al. | 320/129 |
| 4,740,739 A | 4/1988 | Quammen et al. | 320/129 |
| 4,829,225 A | 5/1989 | Podrazhansky et al. | 320/129 |
| 5,063,341 A | 11/1991 | Gali | 320/160 |
| 5,084,664 A | 1/1992 | Gali | 320/160 |
| 5,179,335 A | 1/1993 | Nor | 320/160 |
| 5,256,957 A | 10/1993 | Wiesspeiner | 320/161 |
| 5,307,000 A | 4/1994 | Podrazhansky et al. | 320/129 |
| 5,334,925 A | 8/1994 | Kendrick | 320/131 |
| 5,463,304 A | 10/1995 | Winters | 320/139 |
| 5,479,084 A | 12/1995 | Satsuma et al. | 320/136 |
| 5,491,399 A * | 2/1996 | Gregory et al. | 320/102 |
| 5,525,892 A | 6/1996 | Phommarath | 320/139 |
| 5,561,360 A | 10/1996 | Ayres et al. | 320/129 |
| 5,600,227 A | 2/1997 | Smalley | 320/131 |
| 5,629,600 A | 5/1997 | Hara | 320/132 |
| 5,633,574 A | 5/1997 | Sage | 320/129 |
| 5,648,714 A | 7/1997 | Eryou et al. | 320/139 |
| 5,652,497 A | 7/1997 | Boivie | 320/128 |
| RE35,643 E * | 10/1997 | Gali | 320/119 |
| 5,714,865 A | 2/1998 | Thomas | 320/139 |
| 5,777,456 A | 7/1998 | Kern | 320/128 |
| 5,905,363 A | 5/1999 | Helbing et al. | 320/131 |
| 5,998,968 A * | 12/1999 | Pittman et al. | 320/130 |
| 6,023,149 A | 2/2000 | Pizzi | 320/128 |
| 6,097,172 A | 8/2000 | Podrazhansky et al. | 320/128 |
| 6,100,668 A | 8/2000 | Takano | 320/129 |
| 6,118,275 A | 9/2000 | Yoon et al. | 320/139 |
| 6,130,522 A | 10/2000 | Makar | 320/141 |

\* cited by examiner

*Primary Examiner*—Edward H. Tso
*Assistant Examiner*—Pia Tibbits
(74) *Attorney, Agent, or Firm*—Blakely, Sokoloff, Taylor & Zafman LLP

(57) ABSTRACT

A method to extend the functionality of a battery, the method comprising drawing a current greater than the minimum rejuvenation current from the battery thereby increasing a functionality of the battery.

22 Claims, 8 Drawing Sheets

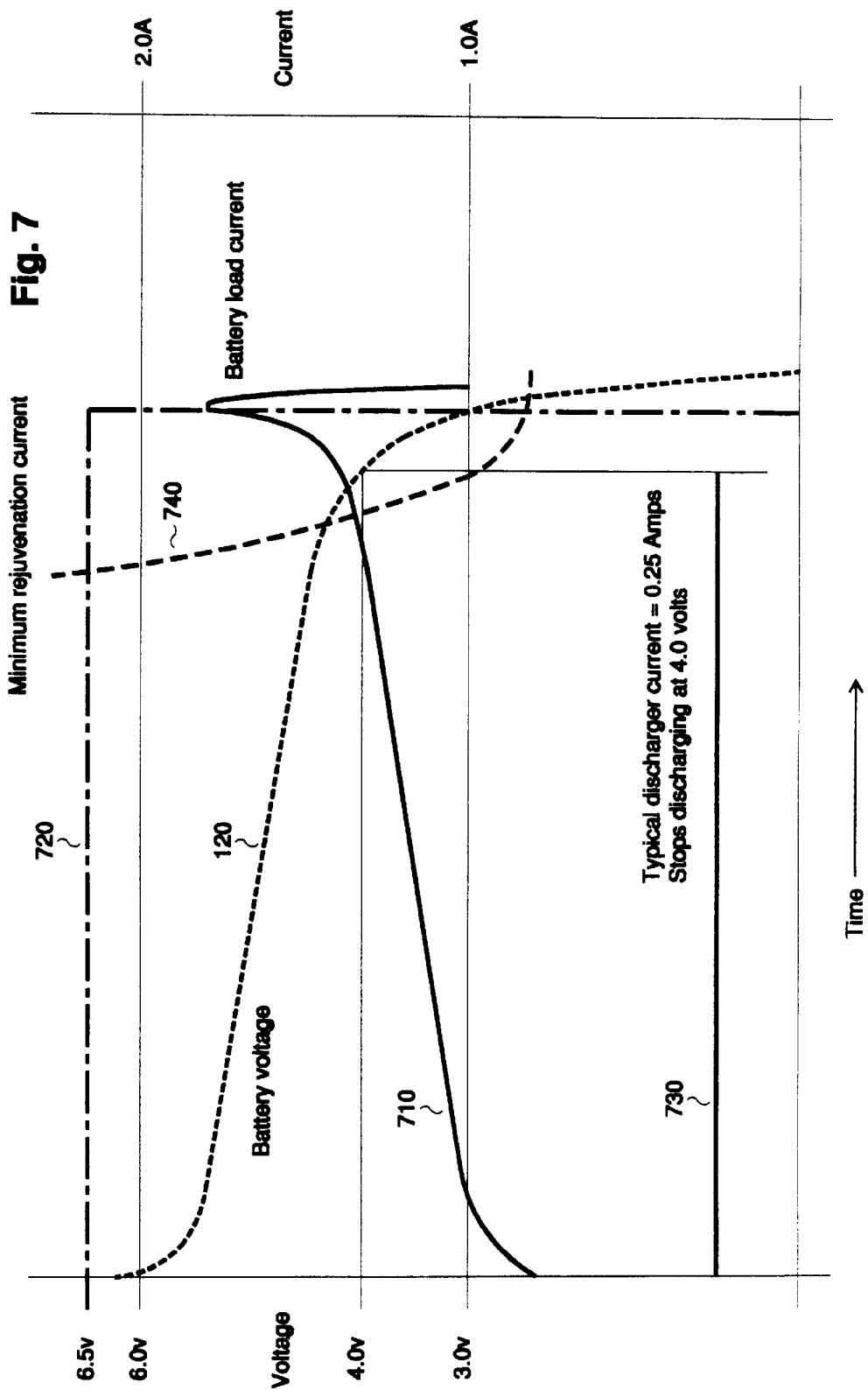

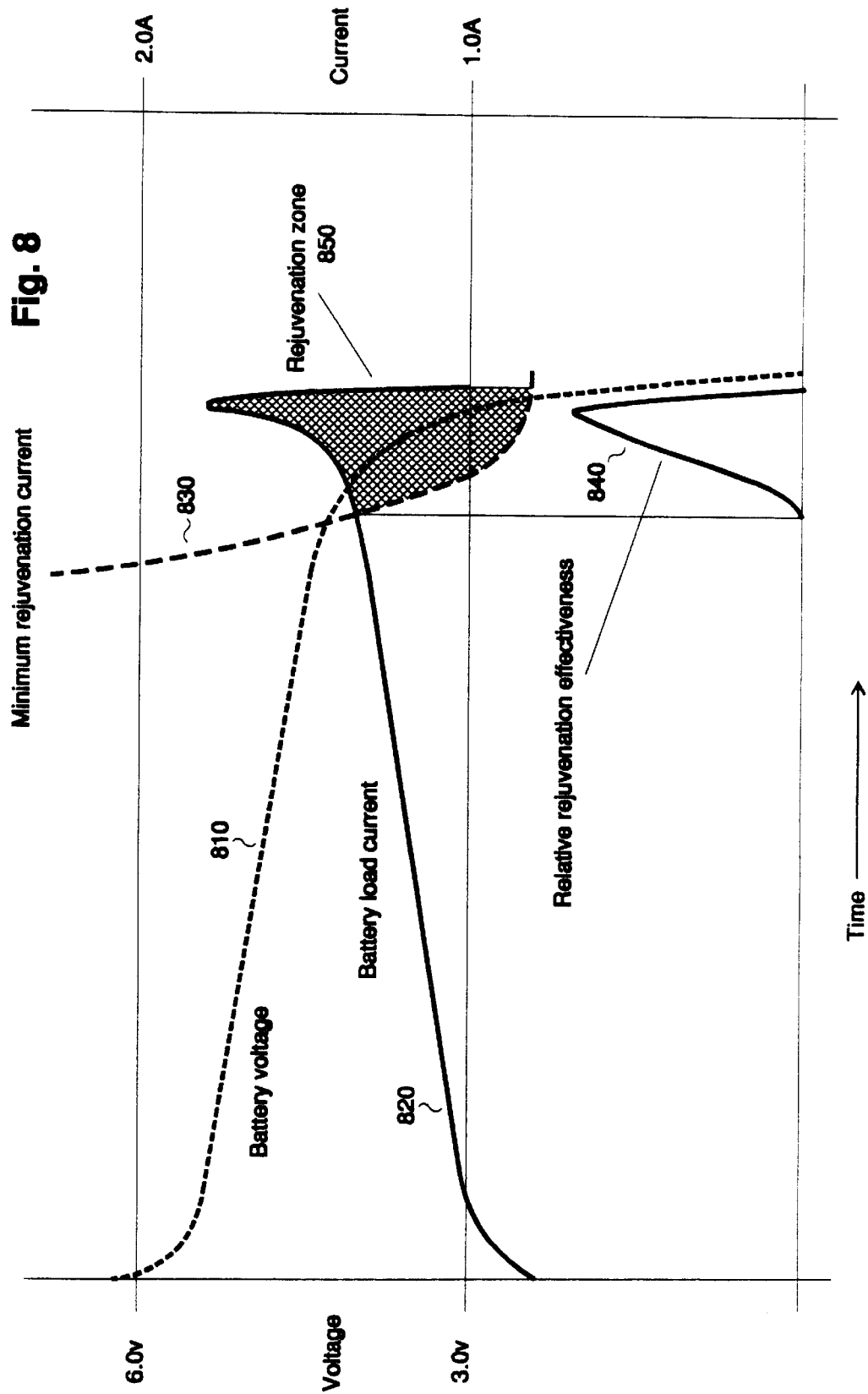

METHOD AND APPARATUS FOR EXTENDING THE FUNCTIONALITY OF A BATTERY

This application claims the benefit of Provisional application Ser. No. 60/157,997, filed Oct. 6, 1999.

FIELD OF THE INVENTION

The present invention relates to batteries, and more specifically, to extending the functionality of a battery.

BACKGROUND

Batteries are used for many functions, to power portable computers, provide backup power, and power all types of portable devices. However, batteries have a limited lifetime. After a period of use, most rechargeable batteries have "voltage depression," which results in the battery lasting for a shorter period on each recharge.

FIG. 1 illustrates a prior art voltage curve, for a new battery 110 and an old battery 120. The turn-off voltage 130 is set, for example for a camcorder, at a level below the level of the fully charged battery. Thus, a new battery, as can be seen, takes an hour to reach the turn-off voltage 130. However, an old battery 120 drops down more rapidly, to reach the turn-off voltage 130 after a mere 2.5 minutes. Thus, the old battery cannot be used to power devices, since the useable time is minimal.

The prior art to reduce the "memory" effect has been to deep discharge the batteries, which is typically done at a current discharge, rate well below the normal operating current level for a given application. Neither the battery run time or lifetime is enhanced by this. In addition, the standard practice of discharging a Nickel Cadmium battery down only to about 1.12 volts, which is considered the fully discharged level for new batteries, contributes directly to the battery "memory" phenomenon where older batteries have greatly reduced run time.

SUMMARY OF THE INVENTION

A method to extend the functionality of a battery, the method comprising drawing a current greater than the minimum rejuvenation current from the battery thereby increasing a functionality of the battery.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 is an exemplary current diagram of a battery during the use of a battery rejuvenator.

FIG. 8 is a diagram of a minimum rejuvenation current versus battery voltage and load current, for one system.

DETAILED DESCRIPTION

A method and apparatus for extending battery functionality is described. The battery functionality for a rechargeable battery includes battery run-time, e.g. the time a single charge lasts, and useable battery lifetime, e.g. the number of times the battery may be recharged and have a useful discharge period. The battery functionality for a non-rechargeable battery is run-time. For the remainder of this application, the term "rejuvenator" or "rejuvenation" will be used for extending the functionality of a battery. This term is to be understood to refer to extending the useable battery lifetime and/or runtime.

Using the rejuvenator, the battery is provided an ideal discharge cycle that eliminates voltage depression and enhances the lifetime and/or runtime of the battery. The difference between the prior art and this invention relates to the discharge current versus battery output voltage. Unlike the prior art where the discharge current decreases with battery output voltage as with a purely resistive load, or a relatively fixed discharge current as with some types of switching regulators, this invention specifically maintains or increases the discharge current near the end of a normal discharge cycle. It has been found by testing that maintaining the discharge current as the battery voltage decreases will eliminate voltage depression. The current level needed to rejuvenate the battery depends on the charge remaining in the battery and output voltage. As the remaining charge and output voltage start to drop, the level of current needed to rejuvenate the battery decreases. This is referred to in this specification as "rejuvenation zone." If the battery is in use during the rejuvenation process, the current may be increased, to compensate for the dropping output voltage, providing a longer runtime as well.

In one embodiment, the battery is discharged to a lower voltage level than is considered normal. In a typical constant load scenario, as the battery voltage decreases the current drain level of the battery must increase. It is the increase in the battery load current near the end of the discharge cycle, when the battery voltage has decreased substantially, which is most beneficial.

The electronic circuit embodied in this invention is comprised of an impedance matcher. For one embodiment, the impedance matching is done by a "boost" or "buck/boost" type switching regulator that is capable of maintaining it's designed output voltage even at a very low battery voltage. Further, for one embodiment, the input to the switching regulator is not heavily filtered, as is normal, thus increasing the instantaneous peak current load on the battery by as much as 100%. This increase further enhances the high current load that eliminates voltage depression.

Figure 1:
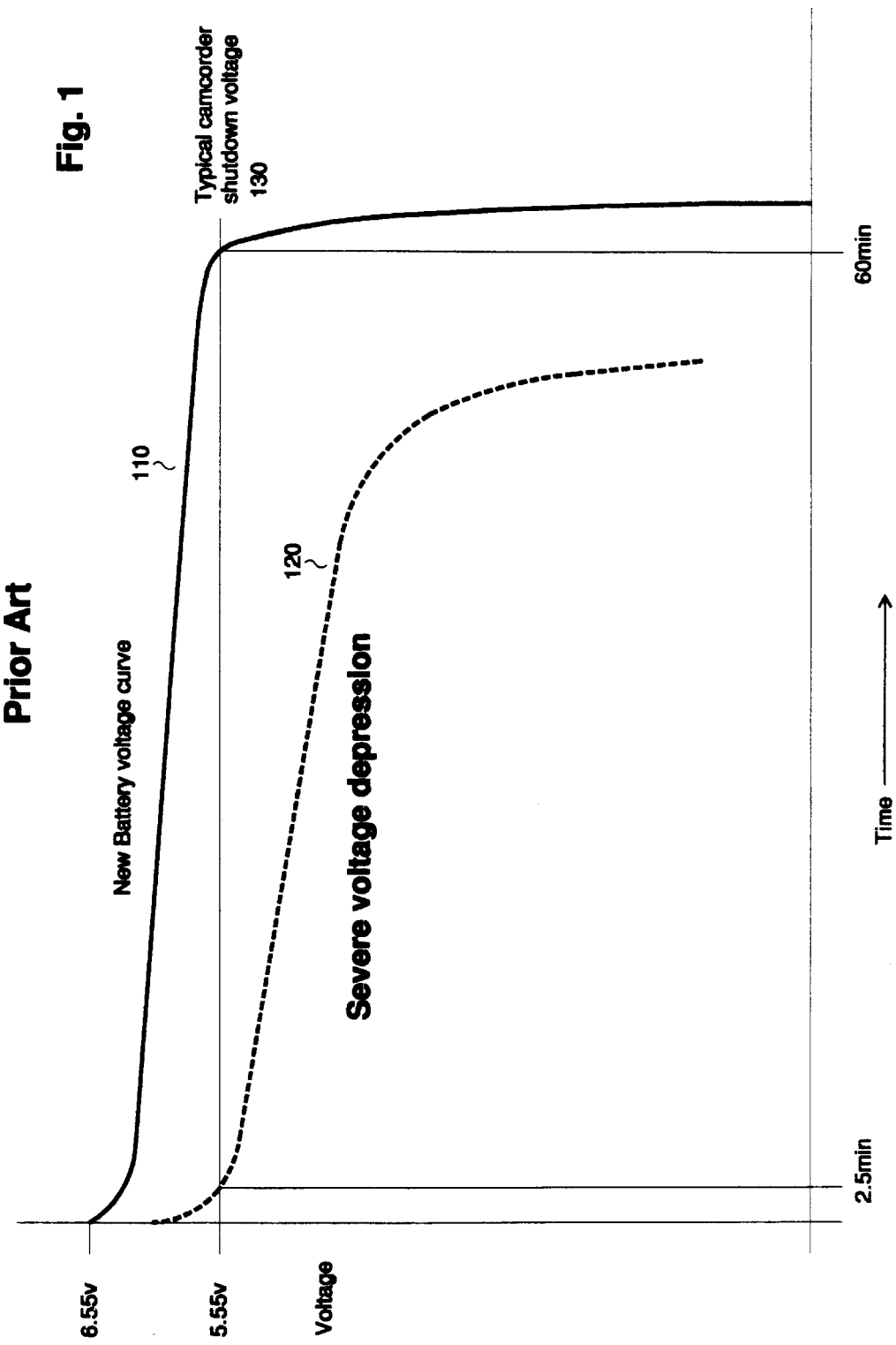
FIG. 1 is a voltage diagram of a prior art battery before use and after use.
Figure 2:
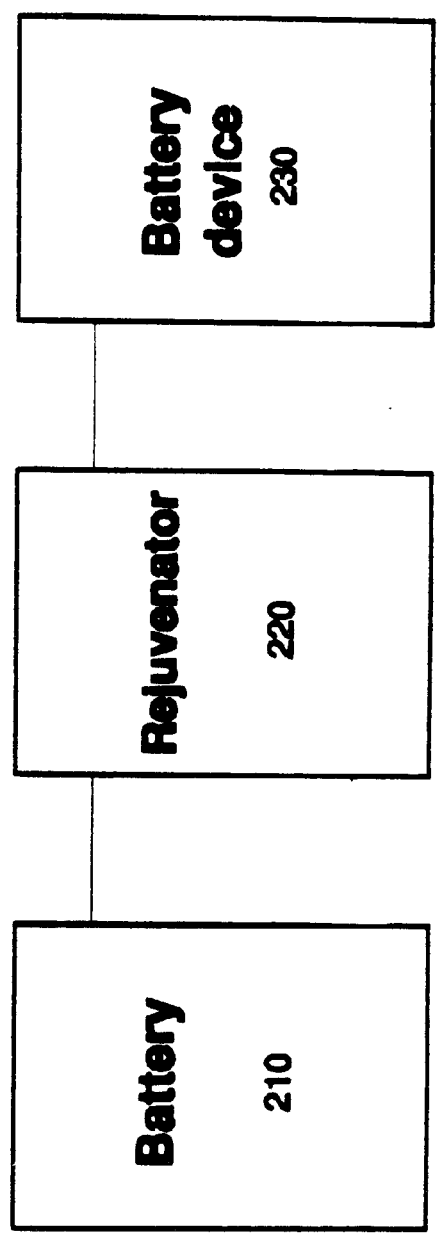
FIG. 2 is a diagram showing the battery rejuvenator coupled to a device.

FIG. 2 is a diagram showing the battery rejuvenator coupled to a device. The battery 210 is coupled to the device 230. The rejuvenator 220 is coupled between the battery 210 and the device 230. For one embodiment, the rejuvenator 220 is only coupled between the battery 210 and the device 230 for a short time, to rejuvenate the battery 210. After the battery has been rejuvenated—for one embodiment one full charge cycle—the rejuvenator 220 may be removed, until the battery's voltage depression again makes the use of the rejuvenator 220 necessary. For another embodiment, the rejuvenator 220 may be kept permanently between the battery 210 and the device 230. The rejuvenator 220 maintains a steady voltage level to the device 230, as the battery's output decreases over time.

For one embodiment, the battery 210 is any nickel based battery, such as nickel cadmium or nickel metal hydride. For another embodiment, the battery may be a lead-acid battery. The battery may further be an alkaline or manganese non-rechargeable battery. Other types of batteries may also be used.

In an exemplary application, the rejuvenator 220 is contained in a housing that is interposed between a Nickel Cadmium battery pack 210 and a device 210 such as a camcorder. The rejuvenator 220 can be considered as an attachment to the battery pack 210 that maintains the voltage supplied to the camcorder 230 above the camcorders minimum operating voltage of 5.6 volts. The typical output voltage of the circuit 220 is 6.5 volts. The circuit 220 will maintain this output voltage with a battery pack voltage as low as 3.5 volts. Since the voltage supplied to the camcorder 230 is constant, the total power supplied to the camcorder 230 is also constant. As the battery pack voltage drops the average battery pack current drain must increase to maintain the constant load power. The current typically increases to as much as twice the normal battery load current. The instantaneous current can be over three times the normal battery load current. This high current rejuvenates the battery 210, enabling the battery 210, without the presence of the rejuvenator 220, to provide power for almost as long as a brand new battery.

Figure 3:
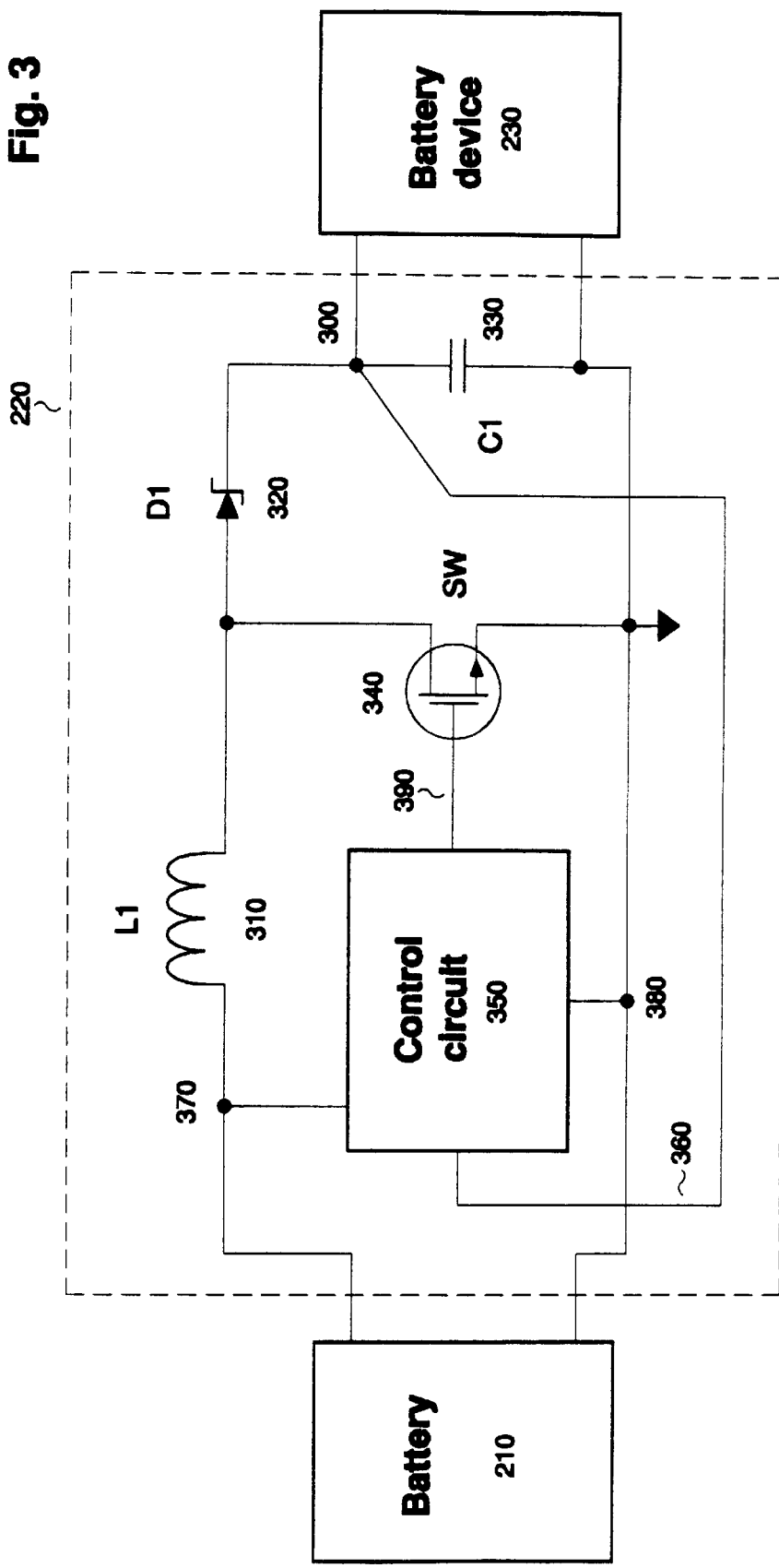
FIG. 3 is a block diagram of one embodiment of the battery rejuvenator.

FIG. 3 is a block diagram of one embodiment of the battery rejuvenator. The inputs to the rejuvenator 220 are from the battery.

The battery 210 is coupled in series with an inductor L1 310, a diode D1 320, and the device 230. The output of inductor L1 310 is coupled to a switch 340. The switch 340 is also coupled to control electronics 350, which determine when the switch is turned on and off. A capacitor C1 330 is coupled in parallel with the device. The input to the device is coupled as a feedback 360 to control electronics 350.

The control electronics 350 are designed to keep the voltage at the output 300 at a stable voltage. The voltage level at the output 300 is the preferred voltage level of the device.

The boost function—having a higher voltage output than input—is achieved by periodically connecting the inductor 310 to ground (switch 340 is ON), then disconnecting it again. When the switch 340 is ON, current starts flowing from $V_{IN}$ to ground via the inductor 310. Before current through the transistor can build up substantially, the inductor 310 is disconnected by switching the transistor OFF. Since inductor current seeks to continue flowing, it flows through the diode 320 and gets rid of the magnetic field's stored energy by building up an increment of charge on the capacitor 330 during the second half of each cycle. The voltage on the capacitor will be higher than the input voltage. The control electronics 350 monitor this output voltage and controls the switching, skipping cycles when the output is too high. Alternatively, pulse width modulation (PWM), in which longer the pulses may be longer or shorter, may be used to control the output. In another embodiment, pulse frequency modulation (PFM), in which pulses of the same width are sent at various intervals, may be used. Alternative methods of responding to stabilize an output voltage may be used.

Figure 4:
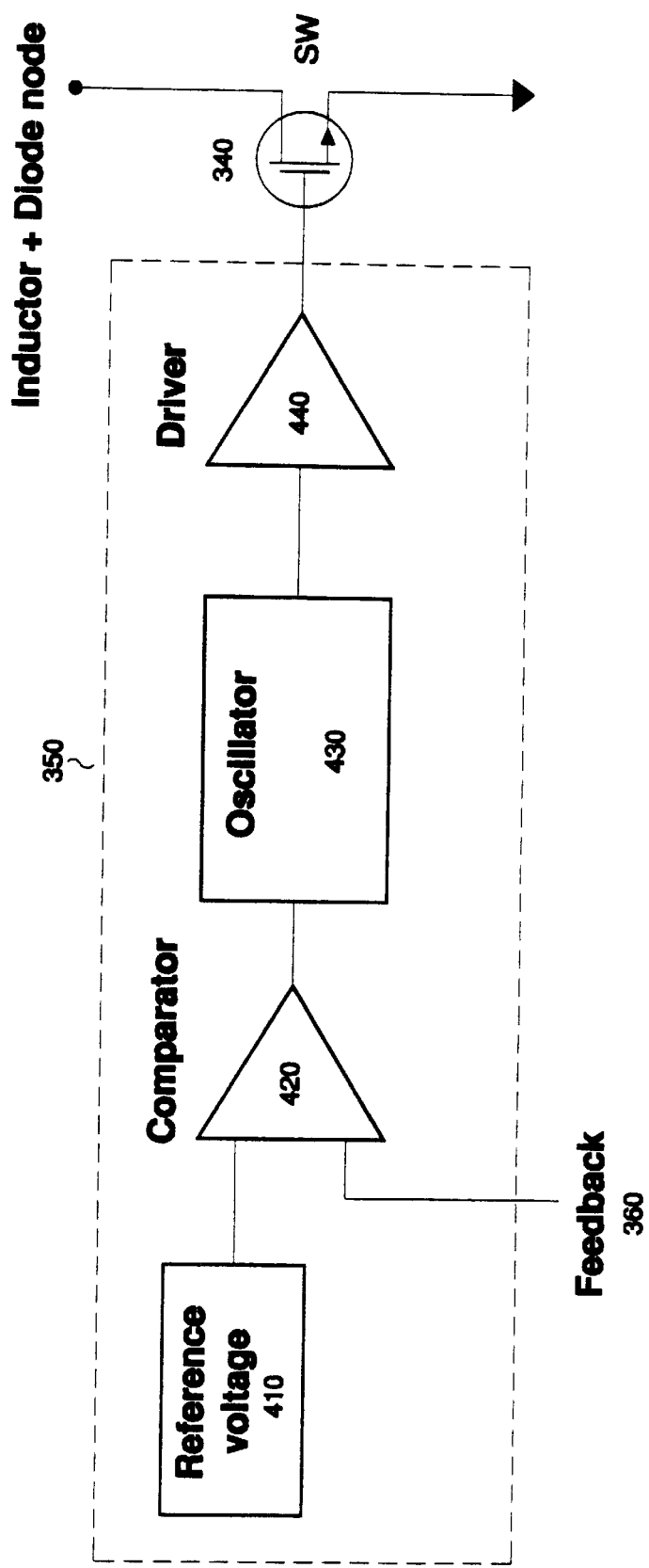
FIG. 4 is a more detailed block diagram of one embodiment of the battery rejuvenator.

FIG. 4 is a more detailed block diagram of one embodiment of the battery rejuvenator. The reference 410 is connected to one input of the comparator 420. The other input of the comparator 420 is from the feedback loop 360. The output of the comparator 420 gates the oscillator 430 on and off. Hysteresis stabilizes the comparator's switching.

As the battery voltage decreases with time, the voltage at the output node 300 decreases proportionally. As the voltage at the output node 300 goes below the value of the reference voltage 410, the internal comparator 420 changes state. At this point, the boost converter 440—built up with the inductor and the diode—begins to transfer energy into capacitor C1 to keep the voltage at output node 300 at the preset voltage.

The lower the battery voltage drops, the more energy has to be transferred, resulting in an increasing switching frequency, and an increasing current level drawn from the battery. This increase in the current demand causes an elimination of voltage depression.

Figure 5:
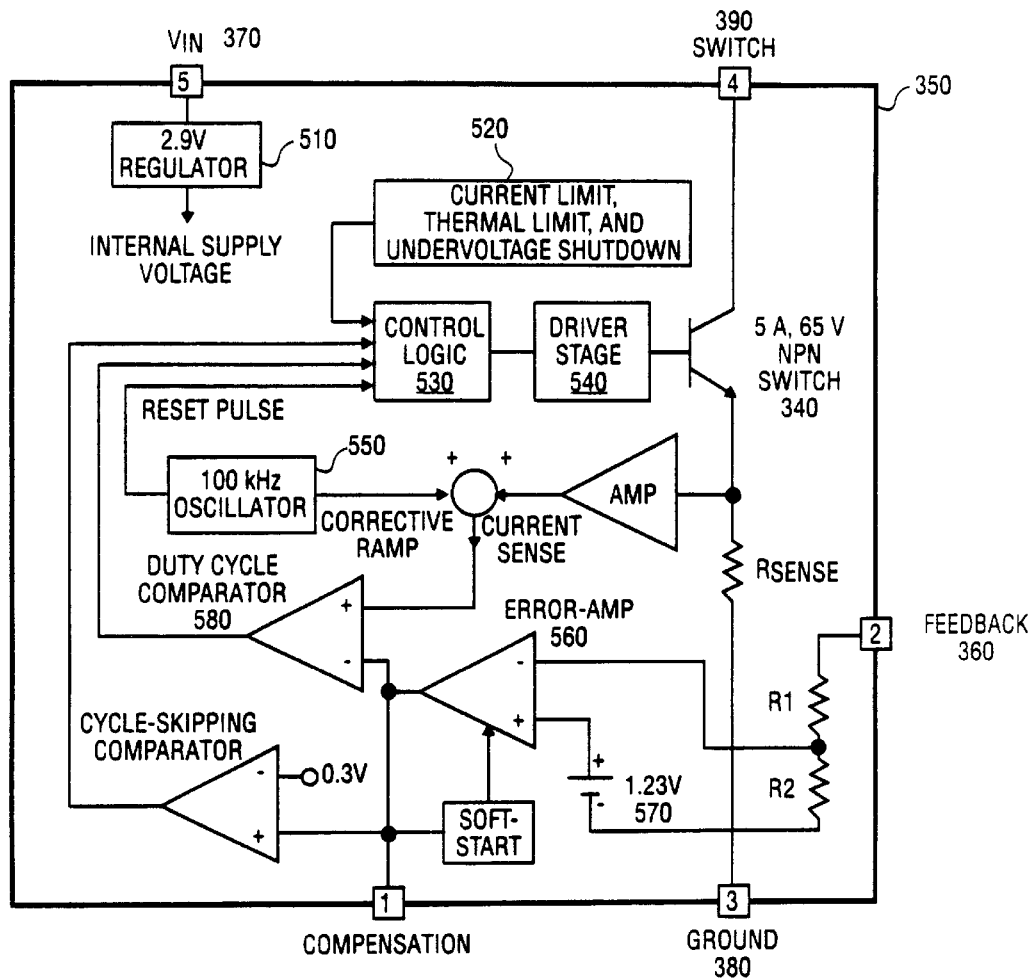
FIG. 5 is a block diagram of one embodiment of the battery rejuvenator.

FIG. 5 is a circuit diagram of one embodiment of the battery rejuvenator. When the NPN switch 340 turns on, the inductor current ramps up at the rate of Vin/L, storing energy in the inductor (not shown). When the switch 340 turns off, the lower end of the inductor flies above Vin, discharging its current through diode (not shown) into the output capacitor Cout (not shown) at a rate of (Vout-Vin)/L. Thus, energy stored in the inductor during the switch on time is transferred to the output during the switch off time. The output voltage is controlled by adjusting the peak switch current. This is done by feeding back a portion of the output voltage to the error amp 560, which amplifies the difference between the feedback voltage and the reference 570. The error amp output voltage is compared to a ramp voltage proportional to the switch current (i.e. inductor current during the switch on time). The comparator 580 terminates the switch on time when the two voltages are equal, thereby controlling the peak switch current to maintain a constant output voltage.

FIGS. 3, 4, and 5 illustrate exemplary implementations of the controller for the present invention. It should be understood that alternative methods of implementing the control circuitry may be used. The control circuit is used to push the battery current into the rejuvenation zone, as is shown in FIG. 8 below. The actual mechanism of increasing the current drawn may be changed without changing this invention.

Figure 6:
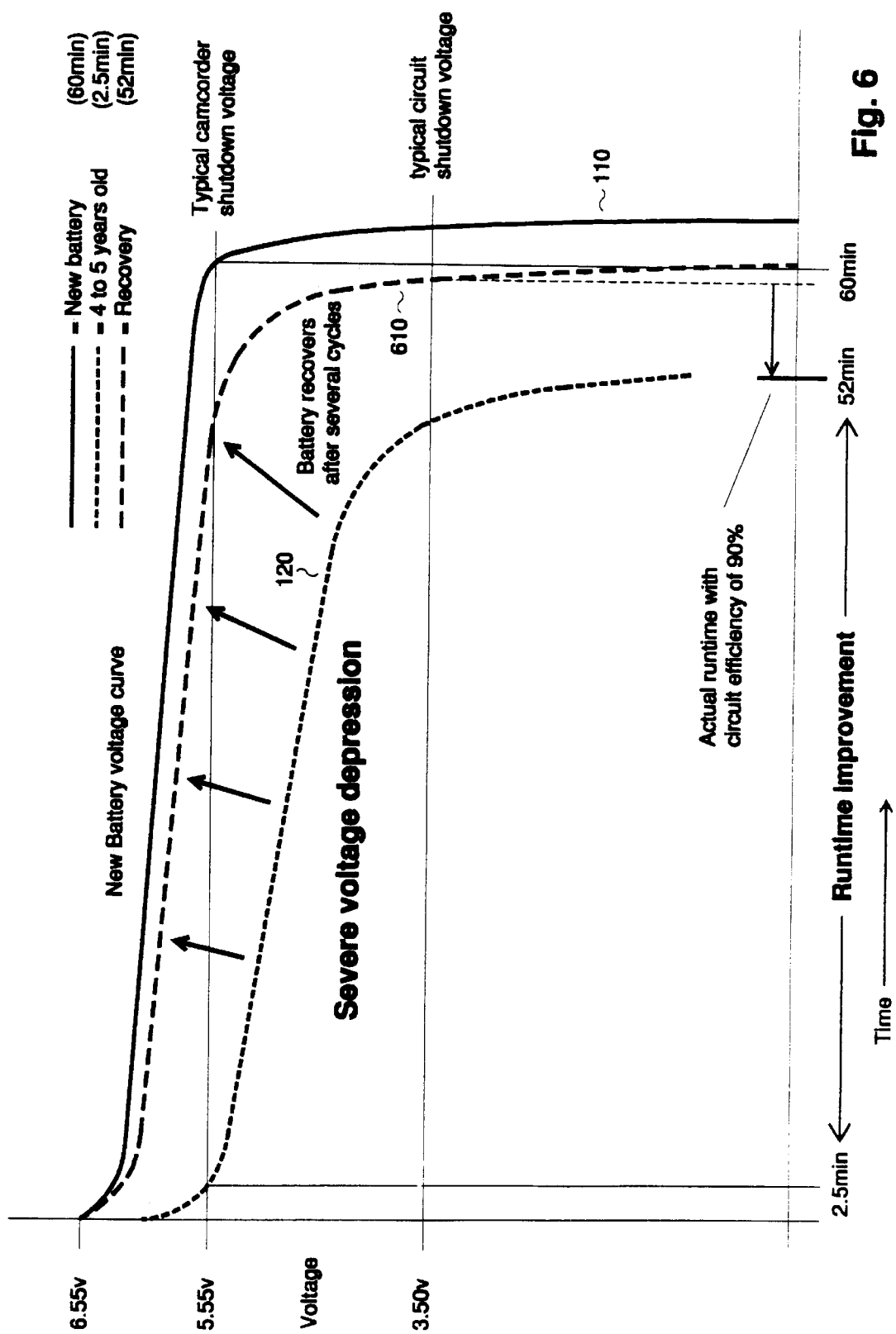
FIG. 6 is an exemplary voltage diagram of a battery before use, with severe voltage depression, and after the use of the battery rejuvenator.

FIG. 6 is an exemplary voltage diagram of a battery before use, after use, and during the use of the battery rejuvenator. Note that all of the numbers in this figure are merely exemplary. The figure is used to demonstrate the relationship between the new, old, and rejuvenated battery. The experiment used to derive these results used a 1000 mA/hour NiCad rechargeable battery.

The new battery voltage curve 110 shows that the battery level starts at 6.55 volts, and slowly moves towards the turn-off voltage 630 of 5.55 volts. It takes a new battery approximately one hour to reach this level. The voltage curve 120 of an old battery exhibiting voltage depression decreases rapidly to below the turn-off voltage 630. For one embodiment, an old battery may last only a few minutes.

The rejuvenated battery voltage curve 610, as can be seen, matches almost exactly the new battery voltage curve 110. Generally, a battery is rejuvenated, e.g. the rejuvenator may be removed and the battery may be used as a normal battery, after several cycles using the rejuvenator. Thus, since the slope of the rejuvenated voltage curve 610 is gentler and starts higher than the old battery voltage curve 120, the battery operates for much longer.

As described above, the rejuvenator may be in place as the battery is used. In that case, the battery output curve may be as the old voltage curve 120, but the voltage level seen at the load, e.g. device using the battery, appears to be a new battery. Of course, this energy is derived directly from the battery. Thus, to compensate for the dropping voltage levels provided by the battery, the current pulled from the battery is increased. The method of doing this was described above.

FIG. 7 is an exemplary voltage and current diagram of a battery during the use of the battery rejuvenator. The output of the battery, which is the input to the rejuvenator, is shown as the battery voltage curve 120. The voltage level at the output node, e.g. the connection to the device, is shown by improved curve 720. As can be seen, the improved curve 720 is flat until shut-off, and is not affected by the decrease in output voltage of the original curve 120. For one embodiment, the rejuvenator compensates for the decreasing battery voltage 120 by drawing additional current 710, until the battery voltage reaches a shut-off level. For one embodiment, for a 6 volt battery the shut-off level is 3 volts.

Current curve 710 illustrates that the current increases from a "normal" value, which would be maintained for a new battery, to a higher current level. For one embodiment, the current level toward the end of the useful life of the battery may be more than twice as high as the initial current. This increased current causes the battery to be rejuvenated, as was described above. The prior art deep discharger current 730 is shown in contrast. The discharger current 730 remains at a steady low level, for example 0.25 amps, and stops discharging when the battery voltage level decreases, for example at 4 volts. Thus, the current level of the discharger never intersects the minimum rejuvenation current. Therefore, it does not result in the rejuvenation of the battery.

FIG. 8 illustrates an experiment-derived set of curves for the battery voltage, battery load current, minimum rejuvenation current, and rejuvenation effectiveness of a battery with voltage depression. The battery voltage 810 exhibits effects voltage depression, shown by its rapid decrease. As the battery voltage 810 decreases, the battery load current 820 is increased to compensate (since power drawn from the battery is maintained constant to generate a constant output voltage and output current to the device).

The minimum rejuvenation current 830 is a function of the battery voltage 810. The higher the battery voltage 810, the higher the minimum rejuvenation current 830. For one embodiment, for some batteries, the minimum rejuvenation current 830 is a logarithmic function. The minimum rejuvenation current 830 drops to below the battery load current 820, in this example at approximately 4.75 V and 1.4 A. Note that in the example shown, the normal in-use current load is approximately 1.2 A. When the battery load current 820 exceeds the minimum rejuvenation current 830, the rejuvenation effects start. As the actual battery load current 820 increases, the relative rejuvenation effectiveness 840 also increases. The relative rejuvenation effectiveness, for one embodiment, is the difference between the battery load current 820 and the minimum rejuvenation current 830.

The battery load current 820 is shown as turning off at a certain level. This is the level at which sufficient power cannot be drawn from the battery to enable an appropriate output voltage and current level. For one embodiment, whenever the rejuvenation mechanism is used, the battery load current 820 is forced to exceed the minimum rejuvenation current 830 for at least a minimum period of time. For one embodiment, the longer the time when the rejuvenation is taking place, the fewer times the rejuvenation mechanism needs to be used. For one embodiment, a single use of the rejuvenation mechanism may be sufficient, for certain batteries at certain current loads. On the other hand, for a very short rejuvenation period, the rejuvenation mechanism may have to be used for multiple discharge cycles. For one embodiment, rejuvenation effectiveness is additive. Thus, each discharge cycle in which the battery load current 820 exceeds the minimum rejuvenation current 830 rejuvenates the battery to a small extend. Over time, the full level of rejuvenation possible for that battery is achieved.

For one embodiment, the full level of rejuvenation possible for a battery may be 100%, at which point the rejuvenated battery acts identically to a new battery. However, in some cases, the battery may be partially damaged, or otherwise unable to be fully rejuvenated. For example, if a battery has certain cells that have been damaged, those cells cannot be rejuvenated. Thus, a typical rejuvenation may restore the battery to 92% effectiveness, for example. For one embodiment, the typical rejuvenation varies by battery type, as well as the type of use that was made of the battery. For example, a camcorder battery may have a lower level of rejuvenation if the battery has been left discharged for an extended time, or if the battery has been stored in an excessively hot location, leading to battery damage. In general, any damage that is at the cell level, e.g. physical damage within the battery, cannot be eliminated using the rejuvenation technology described.

Note that the voltages and current levels provided in FIGS. 6, 7, and 8 are exemplary, based on the unexpected results derived from experiments using a 1000 mA/hour rechargeable NiCad batteries. It is to be understood that other batteries would have similar, but not identical curves.

This rejuvenation system uses an impedance matcher to provide a steady voltage to an output node and to increase the current to compensate for reduced battery voltage. This increased current has been shown, contrary to expectations, to cause a rejuvenation of the battery life. This unexpected result of the increased current is highly beneficial, as it allows an old battery to be rejuvenated to within 5% of its original lifetime. This increase of up to 95% of the functionality of an old battery provides significant benefits.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of rejuvenating a battery comprising:
    establishing a minimum current that results in rejuvenation of the battery; and
    drawing a current equal to or greater than the minimum current from the battery.

2. The method of claim 1, wherein the minimum current is a function of the battery voltage.

3. The method of claim 2, further comprising calculating the rejuvenation current, comprising:
    drawing a first current level from the battery at a first battery voltage;
    determining whether a rejuvenescent effect has been observed; and
    if the rejuvenescent effect has been observed, determining that the first current level at the first battery voltage was at least at the minimum rejuvenation current.

4. The method of claim 1, further comprising:
    boosting a voltage seen at a device powered by the battery by drawing an additional current from the battery; and drawing said additional current greater than or equal to the minimum current at substantially near an end of a discharge cycle of the battery.

5. A method to reduce voltage depression in a rechargeable battery, the method comprising:
   determining when said rechargeable battery is near an end of a discharge cycle; and
   increasing the rechargeable battery load current level to a level greater than a normal in-use discharge current level.

6. The method of claim 5, wherein the battery load current level periodically increases to at least 2.0 times above a normal in-use discharge current level.

7. The method of claim 5, further comprising:
   installing a rejuvenation mechanism between the rechargeable battery and a device using the rechargeable battery during use for several cycles as necessary to accomplish the rejuvenescent effect, the rejuvenation mechanism boosting the voltage level from the rechargeable battery by drawing the additional current.

8. The method of claim 7, wherein the rejuvenation mechanism is coupled between the rechargeable battery and the device for a plurality of discharge cycles.

9. A method of reversing voltage depression in a battery comprising:
   receiving a battery that has an in-use time that is reduced compared to a new battery;
   coupling a rejuvenator between the battery and a device during use of the battery, the rejuvenator:
      detecting an output voltage of the battery at an output node;
      if the output voltage is below a value, boosting a voltage level at the output node, by pulling increased current from the battery, the current greater than a minimum current that results in rejuvenation of the battery at one point; and
   de-coupling the rejuvenator from between the battery and the device after a plurality of discharge cycles.

10. The method of claim 9, wherein the battery is a rechargeable nickel cadmium (NiCad) battery.

11. The method of claim 9, further comprising, during the use of the rejuvenator:
    periodically drawing an instantaneous current of at least 2.0 times above a normal discharge current level.

12. An apparatus to improve functionality of a battery comprising:
    a device; and
    an impedance matcher to output a steady voltage and current to the device, the impedance matcher coupled between the battery and the device,
    the impedance matcher further to draw a current from the battery that is greater than a minimum current that results in rejuvenation of the battery at a battery voltage level.

13. The apparatus of claim 12, wherein the minimum current is a function of the battery voltage.

14. The apparatus of claim 12, wherein the impedance matcher comprises:
    a comparator; and
    a driver to boost the battery voltage to the steady voltage and current seen at the device.

15. The apparatus of claim 14, wherein at an end of a discharge cycle of the battery, the current drawn from the battery by the impedance matcher exceeds the minimum current.

16. The apparatus of claim 14, further comprising using one of the following to boost the voltage: pulse skipping, pulse width modulation (PWM), and pulse frequency modulation (PFM).

17. An apparatus to reduce voltage depression in a rechargeable battery during use comprising:
    an inductor coupled in series with a diode, a device powered by the rechargeable battery, and the rechargeable battery;
    a switch coupled in parallel with the rechargeable battery, the device, and a capacitor;
    a control circuit for switching the switch such that the control circuit maintains a voltage level at an output node by pulling a current from the rechargeable battery toward an end of useable rechargeable battery lifetime that is increased above a minimum rejuvenation current level and results in rejuvenation of the rechargeable battery.

18. The apparatus of claim 17, wherein the rechargeable battery is a rechargeable nickel cadmium (NiCad) battery.

19. The apparatus of claim 17, wherein an output of the rechargeable battery is not filtered, such that device power requirement spikes lead to spikes in instantaneous current drawn from the rechargeable battery.

20. The apparatus of claim 19, wherein the instantaneous current is periodically at least 2.0 times above a normal discharge current level.

21. The apparatus of claim 19, wherein the control circuit comprises a switching regulator.

22. A method of rejuvenating a battery during use comprising:
    coupling an exhausted battery having a reduced use-time to a device;
    coupling a rejuvenator between the battery and the device, the rejuvenator:
       boosting an output of the battery to a preset level; and
       increasing a discharge current level of the battery at least 2.0 times above a normal use level near an end of the discharge cycle.

* * * * *